United States Patent Office 2,886,449
Patented May 12, 1959

2,886,449

METHOD OF MAKING CHEWING GUM AND THE RESULTING PRODUCT

Harold Rosenthal, Newtonville, Franklin Kramer, Lexington, Ernst Albert Steigmann, Winchester, and Arthur F. Tole, Melrose, Mass., assignors to General Foods Corporation, White Plains, N.Y., a corporation of Delaware No Drawing. Application March 10, 1959
Serial No. 795,574

13 Claims. (Cl. 99—135)

This invention relates to a process for preparing improved chewing gum which is characterized by a flavor which is controllably released over an extended period of time at a high level.

Chewing gum may comprise a substantially water insoluble, chewable, plastic gum base such as chicle, or substitutes therefor, including jelutong, guttakay, rubber, or certain comestible natural or synthetic resins or waxes. Incorporated with the gum base, and in intimate admixture therewith, may be plasticizers or softening agents, e.g. glycerine; flavoring agents e.g. oil of wintergreen, oil of spearmint, oil of peppermint, licorice, fruit flavors, spice oils, etc.; or sweetening agents which may be sugars including sucrose or dextrose and/or artificial sweeteners such as cyclamates or saccharin. Other optional ingredients may also be present.

It is found that when most flavored chewing gums, such as slab gums, are chewed the initial perception of flavor appears after a minute or more at a low level, and after three or four minutes of chewing the flavor intensity drops to an uninteresting level. It is also found upon analysis, that gum chewed for as long as thirty minutes may retain as much as 60% of the flavor initially present, and that this proportion of the flavoring agent is thus not effectively used.

It is an object of this invention to provide a chewing gum containing a flavoring composition characterized by an early flavor perception and an extended period of controlled flavor release. A second object of this invention is to provide a chewing gum containing a flavoring composition which is similar in flavor character to that of the original flavoring oil. A third object of this invention is to increase the total amount of flavor released during the chewing period of gums containing the herein described flavoring composition. Another object of this invention is to reduce the amount of flavoring composition which is required. Other objects of this invention will be apparent to those skilled-in-the-art from the following detailed description of the invention.

In accordance with certain aspects of this invention, chewing gum containing a flavoring composition characterized by an extended flavor perception time, true flavor character, controlled release of a large portion of flavoring agent, and reduction in amount of flavor oil required may be prepared by the process comprising forming a gelatin-coacervated flavor, and substantially uniformly distributing said gelatin-coacervated flavor within an all-enveloping mass of a chewable gum base. The product chewing gum thus comprises preferably finely divided particles of coacervated gelatin containing a water-immiscible flavoring agent therewithin and an all-enveloping mass of a chewing gum base within which the particles are substantially distributed.

The gelatin which may be employed in this invention may be any of the grades and types of gelatin, including those obtained from e.g. tanner's stock, ossein, pigskin, etc. The Bloom of the gelatin which is employed may vary widely. Although a particularly rapid release may be obtained by use of gelatin having a Bloom of about 50 or less, the Bloom may be as high as 200 or even higher.

In carrying out the process of this invention according to the embodiment, a volatile, water-immiscible flavoring oil may be coacervated within a body of gelatin. Coacervation may be effected by various techniques which permit attainment of an apparently solid body or capsule of gelatin containing therewithin the volatile water-immiscible flavor. Typically the product of this invention may be prepared by emulsifying and dispersing the volatile, water-immiscible flavoring oil throughout an aqueous solution of gelatin, coacervating the same, and separating the capsules from the solution.

The coacervated flavors which may be used in the practice of this invention include those which are formed by so-called simple coacervation as well as those which are formed by complex coacervation. In preparation of the flavor compound by the simple coacervation technique, an aqueous solution of gelatin may be prepared, typically containing up to about 20% gelatin, i.e., 10%–20% gelatin. To this solution may be added a typically volatile, water-immiscible flavoring oil in amount which may by example be 200% by weight of the gelatin. Typically, the solution of gelatin will be at a temperature above the gelation point of the gelatin, typically at 90° F.–140° F., say, 120° F. at the time the desired volatile, water-immiscible flavoring agent is added. The gelatin must be in the gel state and if the Bloom of the gelatin is lower, the lower the temperature at which this can be done. Flavoring agents which may be employed include oil of peppermint, oil of spearmint, fruit essences, licorice, spice oils, and the like. The emulsion of oil in the aqueous solution of gelatin is preferably homogenized.

Coacervation of the solution, which preferably is effected at temperature of about 120° F., to prevent the gelatin from jelling, is induced by adding, slowly and uniformly an aqueous solution of a coacervating salt. Typically, the concentration of the salt solution may be 20%–40%, preferably 20%.

Coacervation may be effected by using any one or more of a wide variety of salts. Although the preferred salt is sodium sulphate, and ammonium sulphate may also be employed, it is possible to coacervate with salts having a cation selected from the alkali metals (including ammonium) and having the following anions: Sulphate, citrate, tartrate, acetate, and chloride.

During the coacervation, the gelatin molecules are deposited uniformly about each oil droplet as a nucleus. The uniform addition of the coacervating salt is accomplished during the continuous agitation. Preferably steps in the technique up to this point are performed at temperature above the melting point of the gelatin—i.e. the solution is in the sol form rather than in the gel form.

Jelling of the solution may be effected by pouring the heated coacervate into an aqueous solution of e.g. 7% sodium sulphate in water at room temperature, i.e., about 70° F. At this point the encapsulation of the oil within the gelatin has in fact taken place and the further steps are to put it into condition for use as intended. The material is filtered and washed with water, at temperature below the melting point of the gelatin, to remove the coacervating salt. If desired, the filtered material may be hardened by treating with aqueous solution of formaldehyde, following which the hardened material is filtered, washed, and dried.

In the preparation of the flavor composition by complex coacervation, the encapsulation of volatile, water-immiscible flavoring oil may be effected by mixing gelatin with another colloid which has a different electric charge, whereby, after mixing, the electric charges of the gelatin and the other material tend to neutralize each other and to precipitate by complex coacervation a composition of gelatin and flavoring oil. More specifically a solution of gelatin containing e.g. from 5% up to about 20% gelatin may be prepared by dissolving the gelatin in requisite amount of water. The flavoring agent may be then introduced to this solution and emulsified by agitation. A second solution may then be formed of a colloid, which colloid has an opposite electric charge in the mixture. Typically, the gelatin employed will have a high pH, say 8, and pH of the other colloid may be less than 7, and the solution of the second colloid will have about the same concentration as does that of the gelatin. A typical colloid which may be used to coacervate gelatin is gum arabic. Under preferred conditions, the emulsion of the gelatin and flavor may be mixed with the sol or solution of the other coacervating colloid; the pH of the mixture may be adjusted, if necessary, so that the ions of the two colloids have different electric charges. Complex coacervation is effected by dilution with water and/or changing the pH of the mixture. All of these steps are effected at a high enough temperature to prevent gelation, typically above about 120° F.

The resulting complex coacervating material is cooled to cause it to jell. If desired, the pH may be adjusted toward the alkaline side to promote hardening of the gelatin. Hardening may be effected by adding a hardening agent such as formaldehyde. After agitation to facilitate hardening, the capsules may be separated from the liquid, dried, and comminuted if aggregated.

The product obtained by these coacervation techniques consists essentially of a plurality of individual capsules each containing encapsulated therewithin a small body of volatile, water-immiscible flavoring oil. Formation of flavored chewing gum may be effected by mixing from 3% to 30% by weight of a coacervated flavoring composition with from 70% to 97% by weight of gum base. A preferred composition may contain 15% of the dried coacervated flavoring composition in 85% by weight of gum base. Typically the gum base will be chicle, although it may be jelutong, guttakay, etc. Other ingredients including sweetening agents, coloring agents, etc., may be present in desired amount.

Although the chewing gums of this invention may be prepared containing a single flavoring agent, it is possible to extend the range of properties of the gum by use of combinations of two or more flavoring compositions. For example, it is possible to separately prepare dry flavoring compositions from gelatins of various Blooms, and then to add these compositions to a gum. Such a chewing gum may for example contain a mixture of flavoring compositions prepared from a low Bloom gelatin and a high Bloom gelatin. The properties of the chewing gum product will be intermediate to the properties obtained from each of the flavoring compositions when used separately. Specifically if a flavoring composition formed from 50 Bloom gelatin is mixed with a flavoring composition formed from 200 Bloom gelatin, and the mixture is added to a chewing gum, the product may have a flavor release which is substantially more even over the chewing period than is the case when a single flavoring composition is employed.

Similarly it is possible to modify the properties of the product gum by use of mixtures of flavoring compositions characterized by different ratios of gelatin to oil. If a composition containing 10% flavoring agent by weight of gelatin is mixed with one containing 100% flavoring agent by weight of gelatin, the resulting blend of flavoring composition will yield a chewing gum having a more even liberation of flavor than is obtained by use of either flavoring agent alone.

Controlled liberation of flavor of the product chewing gum may also be obtained by using mixtures of flavoring compositions of different particle size, the resulting gum deriving much of its initial flavor from the smaller particles and much of its later flavor from the larger particles.

It is also possible to obtain chewing gum products having extended flavor liberation time by use of the herein described fixed flavors in combination with infixed flavors. A particularly desirable product contains 80% unfixed flavor and 20% fixed flavor.

The resulting chewing gum may include an all-enveloping mass of gum base such as chicle, within which is substantially uniformly distributed particles of gelatin-encapsulated flavoring agent.

It is characteristic of this chewing gum product that it retains its flavor under conditions of vigorous chewing for extended periods which may be double that of compositions heretobefore known to those skilled-in-the-art. For example, the flavor perception time may be six minutes or longer, in contrast to the usual three minutes which is the flavor perception time of comparable products heretofore known.

The chewing gum so formed is also characterized by high degree of flavor release. The products herein described may retain as little as 25%–35% of the flavor originally present after mastication for 30 minutes. Gums heretofore available, when chewed for the same time, are found to retain as much as 60% of the flavor originally present which is being released at such a slow rate that the intensity of flavor is at an uninteresting level.

The greater availability of flavor by use of the flavoring compositions herein described also permits attainment of high flavor level in the chewing gum products with use of lower amounts of the flavoring oils.

Chewing gums prepared with the flavor composition in accordance with this invention, have a flavor character more nearly that of the original flavor oil than chewing gum prepared by the direct incorporation of the flavoring oil into the chewing gum.

The following specific examples will serve to illustrate preferred embodiments of this invention:

*Example I*

According to a specific example of this invention, 10 parts by weight of 50 Bloom pigskin gelatin was added to 90 parts by weight of water at a temperature of 150° F. The mixture was agitated until the gelatin completely dissolved and the solution was cooled to 120° F. 20 parts by weight of methyl salicylate (oil of wintergreen) were added to the solution which was then homogenized to form an emulsion having particle size typically in the range of 2–5 microns. This material is kept at 120° F. under which conditions the gelatin will not jell.

Coacervation was induced by adding, slowly and uniformly 40 parts by weight of a 20% aqueous solution of sodium sulphate. During coacervation, the gelatin molecules are deposited uniformly about each oil droplet as a nucleus.

Gelation is effected by pouring the heated coacervate mixture into 1,000 parts by weight of 7% aqueous solution of sodium sulphate at 65° F. The resulting jelled coacervate may be filtered and washed with water at temperatures below the melting point of gelatin, to remove the salt.

Hardening of the filtered cake, in this example, was effected by washing with 200 parts by weight of 37% solution of formaldehyde in water. The cake is then washed to remove residual formaldehyde. 100 parts by weight of chicle were mixed with 18 parts by weight of the above prepared coacervated gelatin-encapsulated flavor. 300 parts of sucrose and 100 parts of corn syrup were added. Mixing was effected in a ribbon blender with jacketed side walls of the type manufactured by the Baker Perkins Co.

Example II

According to another specific example of this invention, 20 parts by weight of gum arabic was dissolved in 160 parts by weight of water and 80 parts by weight of methyl salicylate (oil of wintergreen) were added. The mixture was emulsified and mixed with 20 parts by weight of gelatin dissolved in 160 parts by weight of water. The solution of gum arabic in water is characterized by negative ions. The solution of pigskin gelatin had an isoelectric point of pH 8 and is characterized by positive ions. Coacervation was effected by slow addition to the mixture of water. After slow drop by drop addition accompanied by agitation, coacervation of the solution begins and it is continued until the particle size of the oil droplets on which the coacervated material is deposited is as large as desired, the less water used, the smaller the particle size. All of the foregoing steps are carried out with the ingredients at 120° F.

The resulting coacervate mixture is poured into water at about 32° F., enough water being used to bring the total weight of ingredients to about 4,000 parts by weight. The mixture is agitated and thereafter allowed to stand for one hour at less than 77° F. to form a solution containing therewithin coacervated capsules.

If desired, the so-coacervated material may be hardened. This may be done by adjusting the pH of the coacervate to pH 9–11 with sodium hydroxide and allowing it to stand for about 30 minutes. 19.8 parts by weight of 37% aqueous solution of formaldehyde, previously adjusted to pH 9–11, is added to the coacervate, and the mixture is agitated for at least 10 minutes at 37° F. or less.

The coacervated capsule material is filtered, dried and comminuted.

100 parts by weight of chicle were mixed with 4 parts by weight of the above prepared complex coacervated gelatin-encapsulated flavor, 300 parts of sucrose and 100 parts of corn syrup were added. Mixing was effected in a ribbon blender with jacketed side walls of the type manufactured by the Baker Perkins Co.

A taste test may be made to compare a chewing gum product of this invention with a standard chewing gum containing the same total amount of flavor in unfixed form. During the test, 0.5 inch x 0.05 inch x 0.0625 inch slabs of each gum can be separately chewed and the following noted: Time and intensity of initial flavor, extent of flavor burst, duration of interesting flavor level, and approximate total time during which flavor was available. In these tests, the rating of flavor intensity can be measured by the person chewing, on a scale ranging from 0 to 10, the level of 1 indicating threshold flavor intensity just discernible to the taste, and a level of 10 indicating a maximum intensity above which the sensation originating in the flavor is unpleasant.

The commercially available standard containing unfixed flavor in chicle was characterized by initial indication of flavor at a level of 1 after about 7–8 seconds. Intensity rose to 3 at about 15 seconds, and thereafter at a slower rate to a level of 6 at about 60 seconds. At this point, flavor intensity dropped off to 3 after about 90 seconds. At about 2 minutes, the flavor intensity was at the uninteresting low lever of 1.5. After 4 minutes of chewing, the flavor had dropped below the threshold value of 1, and the standard gum was flat and lifeless.

Samples prepared in accordance with this invention as set forth in Example I or II supra, may be found to have an initial flavor liberation which occurs substantially immediately, i.e. more quickly than does that of the standard, and which is at a higher level than that of of the standard. The flavor or intensity of the chewing gum product of this invention may continuously rise to a high level which may be twice that of the maximum level reached by the standard, and it may remain at this high level for a total period of time which is greater than the total flavor perception time of the standard. Under preferred conditions, flavor liberation may be apparent for a time which may approach 10 minutes. During the entire chewing period, which is typically 2–3 times as long as the chewing period of the standard chewing gum, the flavor of the product of this invention may be found to be rich, full-bodied and substantially true in character.

It will be apparent to the person making the chewing test that the chewing gum sample prepared in accordance with this invention is eminently superior to the sample containing the same amount of flavoring oil in unfixed form. The extended flavor perception time, early flavor release, true flavor character, and high degree of released flavor make this new product superior.

Although we have herein described examples showing certain details of this invention, it will be apparent to those skilled-in-the-art that various modifications and changes may be made which come within the scope of this invention. This application is a continuation-in-part of application Serial No. 604,089, filed August 15, 1956, entitled Product and Process and of application Serial No. 595,610, filed July 3, 1956, entitled Product and Process.

What is claimed is:

1. A chewing gum comprising particles of a coacervated emulsion of finely divided particles of gelatin having dispersed therewithin discrete micro-droplets of a volatile, water-immiscible flavoring agent, and an all-enveloping mass of a chewable gum base within which the particles are substantially uniformly distributed.

2. A chewing gum as claimed in claim 1 wherein said chewable gum base within which the particles of coacervated gelatin are substantially uniformly distributed contains free unfixed flavoring agent.

3. A chewing gum comprising particles of a coacervated emulsion of discrete micro-droplets of a volatile, water-immiscible flavoring agent dispersed in 20–400 mesh particles of gelatin, and an all-enveloping mass of a chewable gum base within which the particles are substantially uniformly distributed.

4. A chewing gum comprising 3% to 30% by weight of a coacervated emulsion of discrete micro-droplets of a volatile, water-immiscible flavoring agent dispersed in finely divided particles of gelatin, and 70% to 97% by weight of an all-enveloping mass of a chewable gum base within which the particles are substantially uniformly distributed.

5. The method of preparing a chewing gum comprising forming a solid coacervated emulsion of a volatile, water-immiscible flavoring agent encapsulated within finely divided particles of gelatin, and substantially uniformly distributing said gelatin-encapsulated flavoring agent within an all-enveloping mass of a chewable gum base.

6. The method of preparing a chewing gum comprising forming a gelatin solution, mixing therewith a volatile, water-immiscible flavoring agent thereby forming an emulsion, coacervating said emulsion whereby solid gelatin particles are formed containing therewithin said flavoring agent in the form of discrete micro-droplets, and substantially uniformly distributing said gelatin particles containing flavoring agent within an all-enveloping mass of a chewable gum base.

7. The method of preparing a chewing gum characterized by extended flavor perception time, true flavor character and high degree of flavor release comprising forming a solid coacervated emulsion of a volatile, water-immiscible flavoring agent encapsulated within finely divided particles of gelatin, and substantially uniformly distributing said gelatin-encapsulated flavoring agent within an all-enveloping mass of a chewable gum base.

8. The method of preparing a chewing gum as claimed in claim 7 wherein said coacervated emulsion is formed by simple coacervation.

9. The method of preparing a chewing gum as claimed in claim 7 wherein said coacervated emulsion is formed by complex coacervation.

10. The method of preparing a chewing gum comprising forming an aqueous solution of gelatin, emulsifying therein a volatile water-immiscible flavoring agent, adding and stirring into the emulsion a previously determined aqueous coacervate salt solution of such concentration and in such amount as to coacervate the emulsion, all of these steps being carried out at temperature above the gelling point of the gelatin whereby the gelatin deposits around each oil droplet encapsulating each of them, gelling the colloid material by cooling, thereby forming particles of coacervated gelatin each containing said flavoring agent, and incorporating said particles within an all-enveloping mass of a chewable gum base.

11. The method of preparing a chewing gum as claimed in claim 10 wherein the salt is selected from the group consisting of sodium sulphate and ammonium sulphate.

12. The method of preparing a chewing gum comprising forming an aqueous emulsion of a volatile water-immiscible flavoring agent in an aqueous solution of gelatin; mixing said emulsion with an aqueous solution of a colloid having an electric charge opposite to that of the electric charge of said gelatin solution, said gelatin and said colloid being used in such concentration that they are compatible in the mixture and form a gellable mixture, the pH of the mixture being adjusted to bring about such differences in electric charge; diluting the mixture uniformly with water in amount sufficient to effect complex coacervation of the gelatin and colloid with deposition of the gelatin around the oil droplets as nuclei, all the foregoing steps being performed at a temperature above the gel point of the sols; cooling the resulting coacervate product to cause gelation of the resulting complex encapsulating material; and substantially uniformly distributing said coacervate of gelatin and flavoring agent within an all-enveloping mass of a chewable gum base.

13. The method of preparing a chewing gum as claimed in claim 12 wherein said colloid is gum arabic.

References Cited in the file of this patent

UNITED STATES PATENTS

| | | |
|---|---|---|
| 748,708 | Dunham | Jan. 5, 1904 |
| 1,526,039 | Arkell et al. | Feb. 10, 1925 |
| 1,993,289 | Stokes et al. | Mar. 5, 1935 |
| 2,157,839 | Wertheimer | May 9, 1939 |
| 2,258,567 | Epstein et al. | Oct. 7, 1941 |
| 2,369,847 | Olsen et al. | Feb. 20, 1945 |
| 2,680,075 | Landau | June 1, 1954 |